United States Patent
Kraft et al.

(10) Patent No.: US 7,103,228 B2
(45) Date of Patent: Sep. 5, 2006

(54) LOCAL CHANGE OF AN IMAGE SHARPNESS OF PHOTOGRAPHIC IMAGES WITH MASKS

(75) Inventors: Walter Kraft, Zurich (CH); Marc Nussbaumer, Zurich (CH)

(73) Assignee: Imaging Solutions AG, Regensdorf (CH)

( * ) Notice: Subject to any disclaimer, the term of this patent is extended or adjusted under 35 U.S.C. 154(b) by 621 days.

(21) Appl. No.: 10/072,773

(22) Filed: Feb. 8, 2002

(65) Prior Publication Data

US 2002/0110282 A1 Aug. 15, 2002

(30) Foreign Application Priority Data

Feb. 9, 2001 (EP) .................................. 01102804

(51) Int. Cl.
*G06K 9/40* (2006.01)
*G06K 9/20* (2006.01)
(52) U.S. Cl. ....................... 382/274; 382/283
(58) Field of Classification Search ................ 382/274, 382/266, 166, 167, 169, 255, 283
See application file for complete search history.

(56) References Cited

U.S. PATENT DOCUMENTS 4,794,531 A    12/1988  Morishita et al.
5,270,530 A *  12/1993  Godlewski et al. ....... 250/208.1
5,357,353 A    10/1994  Hirota
5,524,162 A     6/1996  Levien
5,703,965 A *  12/1997  Fu et al. ..................... 382/232
6,603,878 B1 *  8/2003  Takemoto .................... 382/167
6,757,442 B1 *  6/2004  Avinash ..................... 382/274
6,856,704 B1 *  2/2005  Gallagher et al. .......... 382/263

FOREIGN PATENT DOCUMENTS

EP          0 566 915          10/1993

OTHER PUBLICATIONS

Polesel A., et al., "Image enhancement via adaptive unsharp masking," IEEE Transactions on Image Processing, Mar. 2000, IEEE, USA, vol. 9, Nr. 3, pp. 505-510, XP-006556774. IDDN: 1057-7149.

* cited by examiner

*Primary Examiner*—Bhavesh M. Mehta
*Assistant Examiner*—Wes Tucker
(74) *Attorney, Agent, or Firm*—Weingarten, Schurgin, Gagnebin & Lebovici LLP (57) ABSTRACT

A process for the image sharpening of a photographic image with a multitude of image elements is disclosed, wherein a correction mask for the change of the image sharpness is determined from the image data representing the image to be corrected, whereby the elements of the correction mask for the change of the image sharpness locally describe the degree of contrast change to be carried out for the individual image elements, and whereby additional information relating to the image is used for the determination of the elements in addition to information on the local contrast.

13 Claims, 2 Drawing Sheets

LOCAL CHANGE OF AN IMAGE SHARPNESS OF PHOTOGRAPHIC IMAGES WITH MASKS

FIELD OF THE INVENTION

The present invention relates to a process for the change of an image sharpness of a photographic image by way of a mask. It further relates to a corresponding device, program, computer program medium with the program and image output apparatus, such as photographic printers, or printers or photographic labs or monitors (for example LCD or CLT display) or computers with monitors, which use the process or the program or the device.

Image sharpening processes are known, for example, from A. Polesel, G. Ramponi, "Image Enhancement via Adaptive Unsharp Masking", IEEE Trans. Image Processing, Vol. 9, No. 3, Pgs. 505–510, March 2000, or N. Arad, C. Gotsman, "Enhancement by Image-Dependent Wrapping", IEEE Trans. Image Processing, Vol. 8, No. 8, Pgs. 1063–1074, Aug. 19, 1999. The image sharpening processes are based on a determination of the image sharpness (the contrast) at a location at which the image sharpening is to be carried out. The contrast (the sharpness) is herefor calculated based on brightness data of the neighbouring image elements, in that differences between the different brightness data are calculated according to certain rules.

SUMMARY OF THE INVENTION

It is an object of the invention to enable a local image sharpening of photographic image data in order to globally improve the image.

This object is achieved with a process in accordance with the invention which uses (especially digital) masks for the image sharpness correction. A mask hereby means a correlation between values (which are herein referred to as elements of the mask) and parts of the image, whereby these image parts represent a location in the image and, for example, include an image element (pixel) or several image elements (pixels). Thus, the elements of the mask represent a rule for the local changing of the image sharpness of the image in a certain image portion. They describe especially the degree or extent of the image sharpening to be carried out, especially a contrast increase or decrease at the respective locations, at which the image sharpening is carried out.

The global contrast, in the following also simply referred to as "contrast", particularly corresponds to the difference (and/or the ratio) between maximum and minimum brightness in the (whole) image. The global contrast is preferably determined based on an image which was subjected to an image detail removal process. Preferably, the global contrast is determined based on an image with reduced resolution. The advantage hereby resides in that the sensitivity to noise and to unimportant image details becomes lower.

The detail contrast, which in the following is also called local contrast, describes especially the difference (or the ratio) between maximum and minimum brightness in a certain area surrounding an image point. Preferably, the detail contrast again is determined based on an image which was subjected to a detail removal process and especially an image which has a reduced resolution.

The image sharpness or focus is principally determined by the resolution capacity of the camera optics. This is characterized, for example, by the modulation transfer factor (as a function of the local frequency), for example. An inexact focussing causes an additional lack of focus. When the depth focus is missing, not all objects of the scene can be imaged equally in focus. The focus is preferably judged on the basis of the image with high resolution. Accordingly, the correction mask for the change of the image sharpness described in the following is preferably applied to the high resolution image (fine image). As a measure for the lack of focus and thus the lack of image sharpness, a number of pixels can be used, for example, over which an edge in focus is "smudged". The image sharpness impression can preferably be improved, for example, by filtering (with a filter which enhances higher local frequencies).

In accordance with the invention, the global change of the image sharpness is carried out especially in dependency of the local contrast.

The elements of the correction mask for the change of the image sharpness locally describe especially the degree of the contrast changes to be carried out for the individual image elements, which means especially the change of the local contrast (detail contrast). Especially preferably, the elements of the correction mask for the change of the image sharpness describe the change of the image sharpness which is carried out by way of an adaptation process.

For determination of the elements, information on an image property is especially used, especially a local image property (especially the image property at the location associated with the element). The image property is preferably the local contrast (detail contrast) at the location associated with the element (or the local brightness). In accordance with the invention, the elements are determined not only based on an image property, but further information which relates to the image is used for the determination of the elements.

The process in accordance with the invention preferably uses, for the image sharpening, an image sharpness adaptation process, whereby the elements of the correction mask for the change of the image sharpness fix the change of the image sharpness produced by the image sharpness adaptation process.

The image sharpness change generally can take place so that the image sharpness (local) is approximated to a nominal image sharpness value or a range for the nominal image sharpness, or that it reaches the nominal image sharpness value or lies within the nominal image sharpness value range.

The present invention relates to correction masks for the change of the image sharpness which influence an image property, namely the image sharpness. An image property is an appearance property of the image observed by a human observer and especially of image regions, such as brightness, colour tone, colour saturation, intensity of a colour (for example the value of R for an RGB vector, or the value of C for a CMY vector), image sharpness, contrast, average brightness, average colour, relative number of points of a characteristic colour (for example "memory colour"), local contrast (difference between maximum and minimum brightness), fine and average detail contrast, histogram of the brightness values (feature vector), colour histogram (mermal matrix) mean colour saturation, brightness gradient left/right, up/down, and so on. Image properties are described, for example, in R. W. G. Hunt, "Colour Reproduction by Photography" Rep. Prog. Phys. 1977, 40, pgs. 1071–1121.

In accordance with the invention, the correction mask for the change of the image sharpness is determined from the photographic (especially digital) image data (for example, original image data) to be corrected or image data derived therefrom.

The elements of the mask for the change of the image sharpness are called "Correction Elements". The correction elements are associated with locations in the image, which relate to parts of the image. Such an image part can correspond to an image element (pixel), whereby an image datum is associated with exactly one pixel. However, the image part can also include several image elements. The correction elements set the correction for those image data which relate to the image parts and fix the image property therefor. The correction elements set the change in the image sharpness in the image parts with which they are associated.

In order to achieve the correction, the correction mask is applied to the image data. A image sharpness adaptation process is used herefor, for example an adaptive high-pass filtering or warp-sharpening, in which the extent of the local for the change of the image sharpness in an image part is carried out independent of the mask element which is associated with this image part. A suitable colour space is preferably used for this correlation, whereby before and/or after the correlation a transformation can be carried out in another colour space.

According to one embodiment, the correction mask for the change of the image sharpness is determined not only in dependency of one image property (for example detail contrast), but in dependency of several image properties.

It is an important aspect of the invention that the correction masks for the change of the image sharpness are constructed such that detail information contained in the image is not lost. For this purpose, the elements of the correction mask are preferably designed such that they correct adjacent image elements as equally as possible, or with only little difference. To achieve this, different methods can be used. For example, the image data representing the image can be subjected before and/or after the correction to a process which causes a softening, such as, for example, a data reduction process (for example Downsampling process), a low-pass filtering, an averaging process or a gauss filter. Furthermore, with these processes used for the removal of image details images can be produced which represent the original image without details, i.e. "coarse". Such images are in the following referred to as "coarse images". Based on these coarse images, unsharp masks can be produced. These masks which cause a less sharp image are preferably calculated on the basis of a low-resolution image (coarse image) which was achieved, for example, by Downsampling, whereby especially processing capacity can be saved. Images which include the image details, i.e. those which are not subjected to a detail removal process, are in the following referred to as "fine image". The image data representing the fine image are referred to a fine image data. The correction masks can be determined directly from the fine image data. However, for the reasons mentioned above, they are preferably based on coarse image data which are derived from the fine image data (for example original image data). Correspondingly, the coarse image is derived from the fine image (original image).

The coarse image is represented by coarse image data, which result from the detail removal process. The coarse image just like the original image (fine image) has a multitude of image elements which are in the following referred to as "coarse image elements" whereby "coarse image portions" can be the same as a coarse image element or may include several coarse image elements. A correction mask which is produced on the basis of coarse image data is called coarse correction mask, the elements or which relate to the coarse image portions. The elements of the coarse image mask describe changes in the contrast of the coarse image which are referred to as "coarse changes" and which set the change of the image properties or at least one image property of the coarse image portions. The coarse changes are designed with a view to the contrast changes which must be carried out by the correction mask. For example, the elements of the coarse correction mask are designed such that they change the contrast of the coarse image. When the coarse image was produced with a data reduction process, the correction mask can then be produced from the coarse correction mask by an expansion process ("upsampling"). Should the number of the coarse image elements correspond to the number of the fine image elements, which means the coarse image includes less details but no data reduction process was used, then the correction mask can be equated to the coarse correction mask.

In accordance with the invention, the contrast change fixed by the elements is a function of the local contrast, i.e. the contrast at the location to which the mask element relates, as well as a function of additional information which relates to the image. The additional information can be obtained from the image data (for example information on the colour tone, or image regions which represent skin) as will be described further below, or can be input into the process in accordance with the invention or the system in accordance with the invention in addition to the image data or can be received by them. For example, it can be information on the situation during the image capturing (use of a flash, camera adjustments, etc. so on) or information on the image capturing apparatus (camera). The latter relates especially to information on the camera, the film type and image data processing processes (for example meta-information on the image compression, for example with JPEG) which were carried out before and so on.

The additional information regarding the image makes it possible to carry out a image sharpening adapted to the characteristics of the image.

According to one embodiment, the additional information is information on local image properties which is obtained by analysis of the image data and which is available in addition to information on the local contrast (and/or the local brightness). The additional local image property can be the colour tone and/or the colour contrast and/or the colour saturation which is locally present, which means in the image element or the image elements to which the elements of the correction mask relate or in the vicinity of those elements.

The contrast change carried out with the correction mask for the change of the image sharpness is especially a change in the brightness contrast. The brightness contrast is a function of the difference of the brightness values of neighbouring image elements.

A change caused by the correction mask can also be a change of the colour contrast. The colour contrast is defined, for example, as a function of the distance of the colour values from neighbouring image elements in the colour plane (a, b plane). The colour contrast can also be defined as a function of the differences of the colour intensity of neighbouring image elements. For example, the colour contrast for red can be defined as a function of the differences of the R values (of an R, G, B-vector) of neighbouring image elements. A correction mask which corrects the colour contrast of a specific colour therefore preferably acts only on that aspect of the image data which represents this colour (for example the R value), whereby the correction mask, which causes a change of the brightness contrast, preferably influences that aspect of the image data which represents the brightness (for example the L value of a Lab vector).

The colour contrast can be changed differently for different colours. For example, a correction mask exists which changes the colour contrast for the colour red, another correction mask which changes the colour contrast for the colour green and finally a further correction mask which changes the contrast for the colour blue. Of course, correction masks for other colours are also possible (for example C, M, Y). They are preferably independent colours which span a colour space. By adaptation of the correction mask for the change of the image sharpness to the additional local image properties, an advantageous image sharpening can be achieved. For example, the contrast for typical colour tones (for example skin tones) can be rather reduced while the contrast is rather increased for other typical colour tones (for example vegetation green). Also, in regions of low colour saturation, it can be desirable to lower the contrast in order to avoid possible noise, while it can be desirable in regions of high colour saturation to increase the contrast to make structures more clearly apparent.

According to a further embodiment, the additional information additionally or alternatively is information on the image content. This information can be obtained through additional data which were received in addition to the image data. For example, the information can be transmitted that, the portrait picture type was adjusted at the camera during the image capture. Accordingly, it can be assumed that the image content includes regions which show skin. If the additional data indicate that a flash was used, it can be assumed that with a certain probability overexposed and underexposed regions exist in the image. The images can therefore be assigned to different classes on the basis of the additional information, whereby then a determination of the elements of the correction mask is carried out depending on the classes or the already determined elements are subjected to a class dependent correction.

Preferably, the determination of the additional information on the image content is carried out based on an analysis of the image data, preferably at least on the basis of a majority of the image data. The image can then be classified on the basis of the analysis of the image data. Depending on the class (for example sunrise, flash photography, portrait photograph, and so on) the correction mask for the change of the image sharpness is determined.

The image data are preferably analyzed in order to recognize characteristic image regions. Characteristic image regions are image regions which appear frequently in photographic images. They include for example regions which illustrate a face or skin, regions which illustrate vegetation, for example, trees, regions which illustrate buildings or streets, regions which illustrate sky or beach, and so on. The characteristic image regions can but need not consist of neighbouring image elements. Generally, the majority of the image elements of a characteristic region are neighbouring elements.

Such regions can be determined, for example, by pattern recognition, for example, for face recognition or by recognition of structures. For example, face recognition is possible by way of pattern recognition processes. Information on colour tones is not necessarily required herefor.

Preferably, information on the colour tone is used for the recognition of characteristic regions. For example, skin, sky or vegetation has a typical characteristic colour or typically occupies a certain region in the colour space. By static analysis of a plurality of images one can determine, for example, with which probability a certain colour tone belongs to a certain characteristic colour.

When a characteristic image region is recognized, the determination of the correction mask for the change of the image sharpness is carried out based on this recognition. The determination of the correction mask can be carried out, for example, in that, in a first step, the correction mask is determined on the basis of the local contrast or the local brightness and in a second step the elements of the correction mask are changed in such a way that they at least approximate a nominal image sharpness or a nominal image sharpness range, which is preselected for the recognized characteristic image region. Preferably, an association rule is provided which associates the nominal focus or the nominal image sharpness ranges with different types of characteristic image regions.

The determination of the correction mask for the change of the image sharpness can thereby be additionally carried out on the basis of a degree of belonging. The degree of belonging describes the degree of belonging of an image element to a characteristic image region. For example, in the above mentioned example, the degree of belonging describes the degree of the probability with which a new colour belongs to a characteristic colour tone and thereby to a characteristic image region. The correction of a mask determined in a first step is then carried out depending on the degree of belonging in the direction of the nominal image sharpness. This means that the larger the degree of belonging, the further the approximation to the nominal image sharpness.

The inventors of the present application have discovered that at the transition between characteristic image regions a change of contrast, especially an image sharpening is critical and can easily lead to artefacts. Thus, in accordance with the invention, the image, or an image derived therefrom (for example a coarse image) is examined for transitions between image regions which have a different structure, which means, for example, if high or low space frequencies dominate or if one image property of one image region differs significantly from the same image property of the neighbouring image region (for example by a preselected threshold value or factor). Such transitions exist, for example, between forest and blue sky. Such a transition can be detected apart from an analysis of the space frequencies, for example, by analysis of the distribution of the contrast values. In highly structured regions, a high mean detail contrast appears, while the mean detail contrast is low in less structured regions. Transition regions can be localized, for example, where the first derivative of the contrast course takes on extreme values. In accordance with the invention, preferably no or only a weak contrast change is carried out in the transition regions, to not provoke artefacts. This is the case especially for regions with high detail contrast, which means if the detail contrast is above a threshold value. Alternatively, or additionally, the course of the contrast values after a carried out image sharpening can be subjected to a smoothing by the correction mask in the transition region. The transition between weakly structured and strongly structured regions is preferably considered only with compressed images, especially preferably only with block-compressed images (DCT-compression, JPEG) during the determination of the mask in the above described manner, since (too high) image sharpening strengthens compression related artefacts ("ringing"). "Ringing" is generated, for example, when coefficients of transformed images are quantified or the number of coefficients is reduced. Thus, especially in those compression processes and in loss associated coding processes ("lossy coding"), the transitions are considered. The consideration is preferably carried out in such a way that no focussing takes place where the image sharpness is reduced (unfocussing).

If the image data are present in the form of coefficients which determine the weighting of different space frequencies, as is the case, for example, with the coefficients which result from a discreet cosign transformation (DCT), as is the case with the image compression process JPEG, it can be recognized by way of the coefficients where strongly or weakly structured regions are present. Strongly structured regions are thereby regions especially with a high proportion of high space frequencies and/or a high contrast and weakly structured are especially regions with a low proportion of high space frequencies and/or with a low contrast. A transition region can then be recognized from an analysis of the coefficients.

If it is known from the additional information, which is transmitted in addition to the image data, that the image data were subjected to a process which leads to block formation, as is the case, for example, with JPEG, where the image is blockwise compressed (blocks with 8×8 image elements), the block transitions are preferably especially treated. Particularly, the correction mask (preferably based on the fine image) is constructed such that the mask elements which relate to the block transitions or block edges, cause no or only a small change in the contrast. The block edges are phantom structures which will be strengthened throughout the image without the consideration of the additional information.

Generally, in accordance with the invention, it is preferred that any additional information is processed from which the position of artefacts in the image can be deduced. One preferably foregoes an image sharpening at the position of the artefacts.

The present invention further relates to a device (for example hardware and software or ASIC) for the image sharpening of a photographic image. This preferably includes a correction mask determining unit, for example a CPU, which, for example, stores the image of a correction mask in a memory at preselected addresses, in order to guarantee that the elements can be associated with image parts. The correction mask determining unit determines from the image data which represents the image to be focussed, or from image data derived therefrom (for example, coarse data) the elements of the correction mask. The elements thereby fix the extent of the image sharpening to be carried out for the individual image elements (or coarse image elements). The device preferably further includes an image property determining unit (for example a contrast/brightness determining unit) which locally determines an image property (for example a contrast) in the image (or coarse image). Based on the determined values, the determination unit calculates the mask elements. Preferably, the device further includes an additional information processing unit, which processes further information relating to the image and influences on the basis thereof the determination of the mask elements by the determining unit. The image sharpness change in accordance with the invention which is carried out by an image sharpness change unit depending on the elements of the correction mask, preferably includes the change of a brightness contrast and/or the change of at least one colour contrast.

The invention further relates to a program which induces a computer to carry out the process in accordance with the invention as well as a computer program storage medium on which the program is stored.

The present invention further includes image output devices, for example, photographic printers or printers (for example, inkjet printers, CRT printers, DND printers, photographic printers, monitors, CRT displays, LLD displays) and photographic labs, especially minilabs and microlabs, but also large labs which use the process in accordance with the invention, the device in accordance with the invention or the program in accordance with the invention.

BRIEF DESCRIPTION OF THE DRAWINGS

Further features of the invention are disclosed in the following description of detailed embodiments, whereby features of different embodiments can be combined with one another. The invention will be further described in the following by way of example only and with reference to the drawings wherein.

DETAILED DESCRIPTION OF THE PREFERRED EMBODIMENTS

In accordance with the invention, the additional information relating to the image is preferably captured in the form of masks which are then used for the correction of an already determined correction mask for the change of the image sharpness. This results in a clear association between the elements of the correction mask for the change of the image sharpness and the additional information mask for the optimization of the local image sharpness correction properties of the process in accordance with the invention.

For example, skin, sky and vegetation masks are used, which represent the additional information and which serve the calculation of the correction mask for the change of the image sharpness or the correction of a correction mask for the presharpening of the image calculated in the first step.

It is described in the following by way of example how a correction mask for the change of the image sharpness is determined. The description is with reference to FIG. 1. First, a contrast mask is formed, which characterizes the course of the local contrast in the image. The analysis required therefore is preferably carried out on the basis of a coarse image with an average image resolution (typically 200×250 pixel). The contrast mask so obtained corresponds to the above mentioned coarse mask. The average image resolution is preferably by a factor of 3 to 20 smaller than the resolution of the original image and is produced from the original image by a data reduction process, for example, by "downsampling", whereby image data of the coarse image represent mean values of several neighbouring image data of the fine image. The mean image resolution is preferably about 20,000 to 200,000 pixels. An original image typically includes over 1,000,000 pixels and typically between 1,000,000 and 5,000,000. The difference between maximum and minimum brightness in a vicinity of the neighbouring image point can be used, for example, for a measure of the detail contrast. The detail contrast is a local image property and preferably describes neighbouring points within a small surrounding area, for example 5×5, 7×7, 9×9 pixel, and so on. However, the surrounding area could also be larger, for example, 100×100 pixel. However, as described above, a colour contrast can also be determined and taken into consideration.

Figure 1:
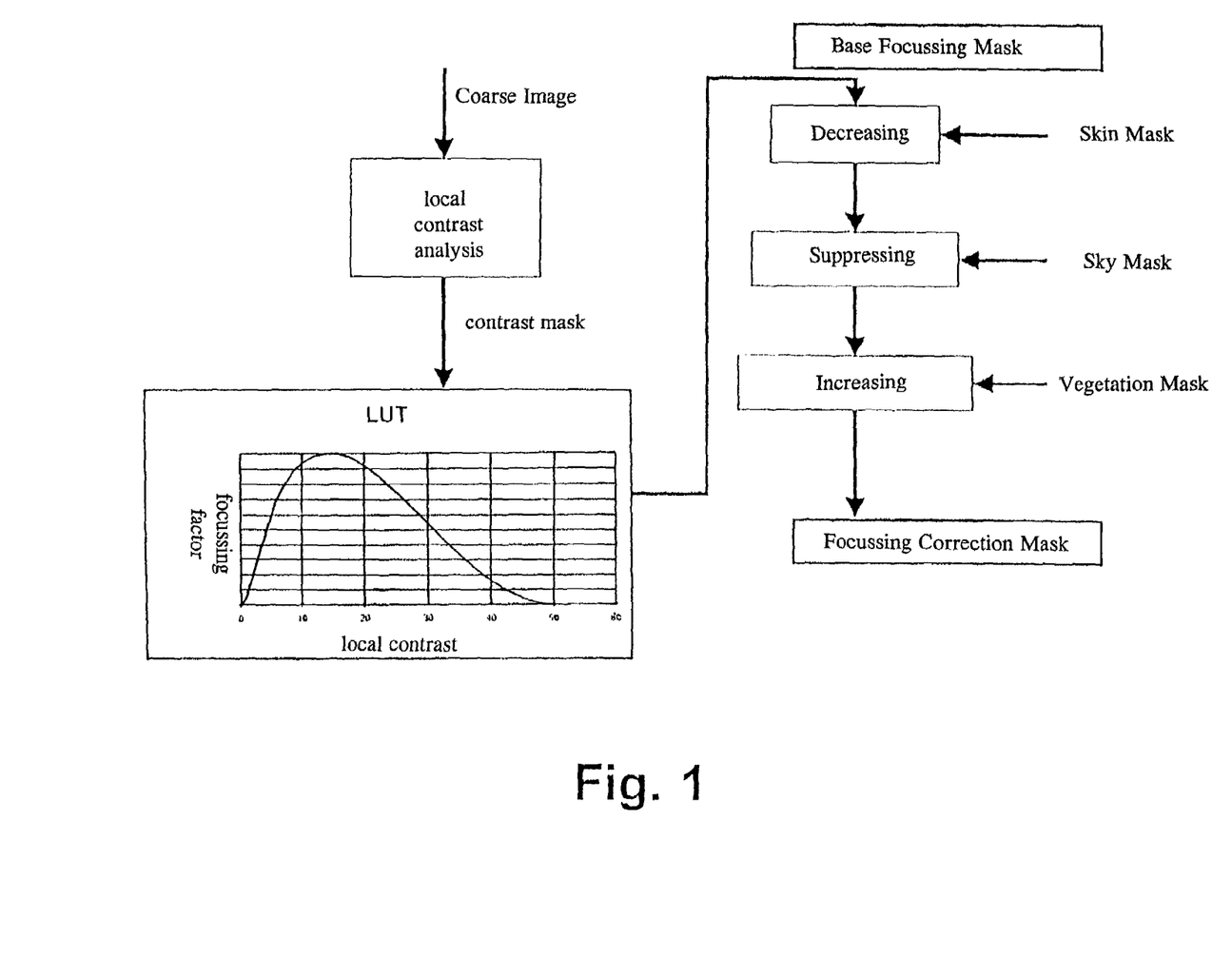
FIG. 1 shows an exemplary sequence of a local focus control according to the invention.

The "contrast mask" determined in this way is now recalculated by way of a function into a "base image sharpening mask". The function is preferably nonlinear. The function can be defined through a table (LUT). The elements of the base focussing mask represent factors for the change of the image sharpness and determine the degree of image sharpening. The connection between the image sharpening factors and the local contrast is shown in FIG. 1.

The image sharpening factors of the base focussing mask preferably have the following properties:

The image sharpening factor decreases in the region of smaller detail contrast. This avoids that the noise is increased in underexposed regions and that homogeneous image regions (such as, for example, sky) have a "grainy" appearance.

The image sharpening factor preferably monotonously decreases to 0 in the regions of higher detail contrast. It is achieved thereby that already image sharpened image regions are not over-sharpened and that in the region of sharp edges no disturbing overswings are created.

The function preferably has a maximum in the region of average detail contrast values which are at about 10–50%, preferably about 20–40% of the maximally determined contrast.

The function, especially the nonlinear function, is preferably adapted to the output medium and optimized in such a way that a maximum image sharpening without artefacts is achieved. This is preferably achieved by way of test patches. Test patches are test images to which the correction mask for the change of the image sharpness is applied which was determined based on the base image sharpening mask. The quality of the correction mask for the change of the image sharpness and thereby the nonlinear function can be determined by visual or automatic analysis of the test patches. The nonlinear function can therefore be optimized by iterative processes. Test patches are generally made of a strip pattern, whereby the strips have different detail contrasts (brightness levels).

The base image sharpening mask is preferably a coarse mask as with the contrast mask, which means is based on coarse image data, which do not contain detailed information. The coarse image data are determined from the fine image data by a detail removal process. If a data reduction process (for example "downsampling") is used as the detail removal process, the coarse masks have a reduced number of elements, which preferably corresponds to the number of elements of the coarse image. The base image sharpening mask, however, is preferably not necessarily present with a reduced number of elements. The base image sharpening mask in a following process step is now corrected in order to obtain the image sharpening mask in the end. The correction is again preferably carried out with a reduced number of elements. In that case, the corrected base image sharpening mask must then be subjected to an expansion process (for example interpolation process), in order to obtain a correction mask for the change of the image sharpness with a number of elements which corresponds to the number of elements of the fine image to be corrected.

Figure 2:
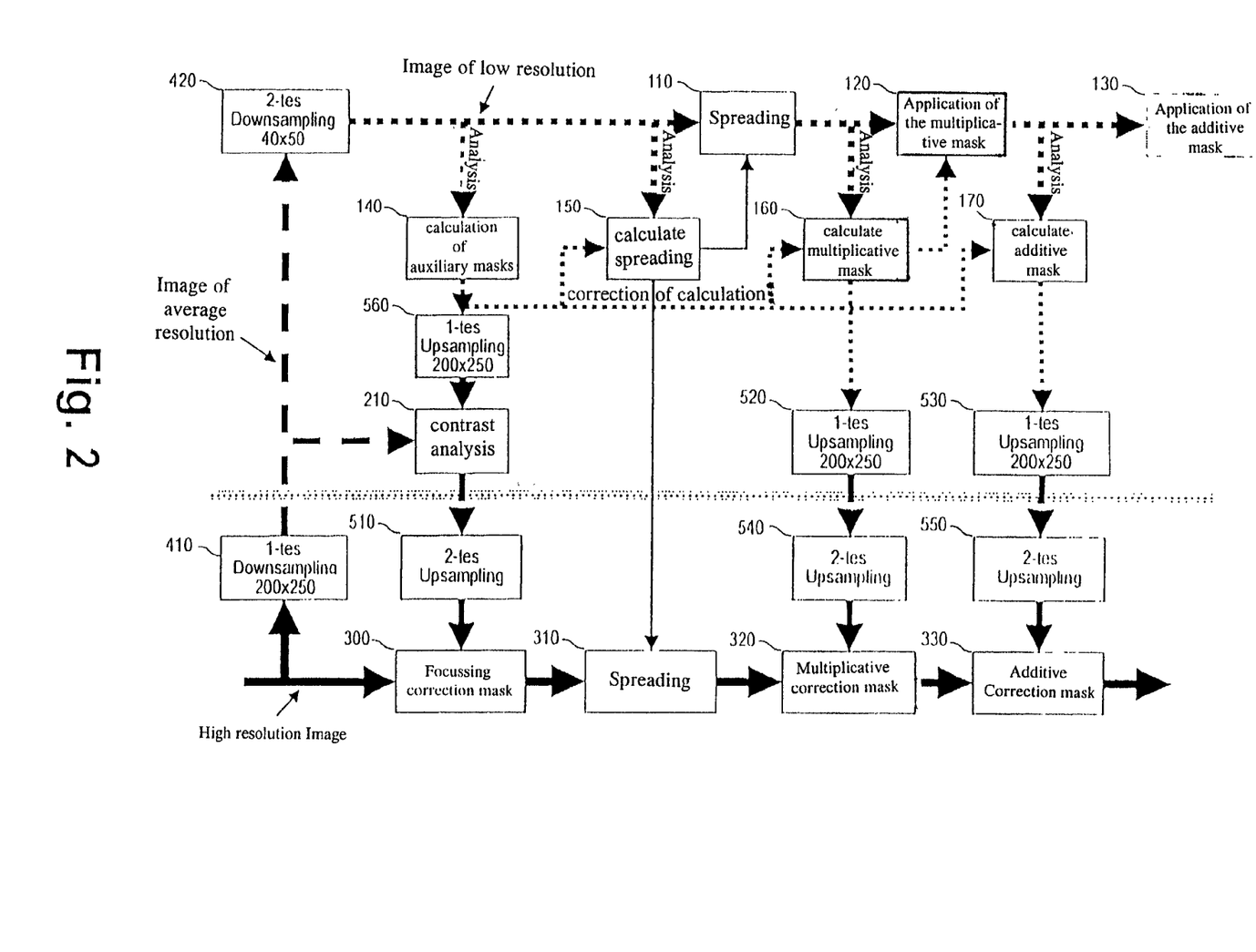
FIG. 2 illustrates the incorporation of the local focus control in accordance with the invention into a general correction system.

The base image sharpening mask is preferably corrected based on other masks, so called additional information masks or auxiliary masks (see FIG. 2). An element of the additional information mask is thereby preferably clearly associated with an element of the base image sharpening mask and describes the degree of change of the associated element of the base image sharpening mask. The additional information masks (auxiliary masks) are preferably determined based on a coarse image (for example, the one used as basis for the local contrast analysis, or based on an analysis of this coarse image). The elements of the additional information mask, for example, can be a function of the local brightness or the local colour saturation or the local colour tone. Preferably, the additional information masks represent information on the image content, such as information on characteristic image regions, such as skin or face. The additional information mask is in this case also referred to as skin mask. Other examples for additional information mask are the sky masks and the vegetation masks illustrated in FIG. 1.

The image sharpening factor is preferably reduced in image regions with skin colour. The fact is thereby considered that with excessive image sharpening, the impression of "unclean" skin is created (pimples, beard hair). Consequently, this reduction can be carried out by way of the multiplication of the image sharpening factor with the expression (1.0−k ×skin indicator), whereby k<1, preferably k=0.5. The skin indicator is a measure for the probability or belonging of an image element to a characteristic image region illustrating skin. The value of the skin indicator of an image element can be determined, for example, on the basis of the colour value, especially the colour tone and/or the colour saturation of the image element. Preferably, distribution functions or probability distributions are given which establish with which probability or with which degree of belonging a certain colour value belongs to a characteristic colour (for example skin colour). The more a colour value deviates from the characteristic colour value, especially a colour tone and/or colour saturation, the smaller is typically the degree of belonging. From this distribution function or probability function a measure can be determined on the basis of the colour values, especially the colour tone and/or the colour saturation, for whether a specific colour value belongs to a characteristic colour. This skin indicator is then determined therefrom, for example.

In image regions with sky colour, the image sharpening factor is preferably also reduced according to an analog process or even reduced to 0.

In image regions with vegetation, a stronger image sharpening is genuinely carried out. This can be achieved analog to the above by way of the vegetation mask.

Finally, the corrected base image sharpening mask determined under consideration of the additional information is brought to the resolution of the image to be sharpened (fine image) by way of interpolation ("upsampling" and "smoothing"), which means a data expansion process.

The original image (fine image) is then subjected to a image sharpness change process which uses as parameters the elements of the correction mask for the change of the image sharpness. The image sharpness change process can be for example, a location variable high pass filtering, as described in A. Polesel, G. Ramponi, "Image Enhancement via Adaptive Unsharp Masking", IEEE Trans. Image Processing, Vol. 9, No. 3, Pgs. 505–510, March 2000. This means the degree of image sharpening varies from image element to image element on the basis of the values of the elements in the image sharpening mask which are especially clearly associated with the image elements. For example, the increase of the higher local frequencies during the high pass filtering process (for example elevation of the strengthening factor of the filter and/or change of the limit frequency of the filter) can be changed depending on the elements of the correction mask for the change of the image sharpness. If an unsharpening is desired, the higher local frequencies can be lowered, for example. The increase or reduction of the image sharpness is generally referred to as image sharpness change. The variation of the image sharpness is thereby gradual, since the coarse image forms the basis for the correction mask for the change of the image sharpness, which includes no detail information. The correction mask for the change of the image sharpness can thereby be considered a low frequency (which means unsharpened) mask. A process for the change of the local contrast can preferably be used as image sharpness change process, whereby the change of the contrast depends on the elements of the correction mask for the change of the image sharpness.

As already mentioned above, several possibilities exist for the carrying out of the image sharpening locally depending on the correction mask. At the adaptive high pass filter, the values associated with the pixels are changed. In contrast, the warp sharpening in an intermediate step leaves the pixel values unchanged. A displacement of the pixels results instead. Overswings can be avoided in this manner. The functioning of the warp sharpening is described in the above mentioned reference by N. Arad, C. Gotsman. Candidates for edges are thereby searched in the image by way of an edge detector. The output of the edge detector is then softened. Thereafter, a relief filter is used and a displacement mask derived therefrom. The original pixels are then displaced by the value given in the displacement mask. This can be carried out, for example, by the principle that upon the displacement by more than half a pixel, the values of the displaced pixels replace the values of the pixels which so far were at this location. Where locations would be vacated by the displacement process, the old values are maintained, for example. The amount of displacement can, for example, be carried out depending on the elements of the image sharpening correction mask.

Since the pixels in such a image sharpening process are always displaced towards the edge, the edges are steepened (made steeper) whereby a image sharpening is achieved. An unsharpening of the image would be achieved by displacing the pixels in such a way that the edges are made flatter.

As already mentioned above, the coarse image can be achieved by downsampling or with filter processes (low pass filter, gauss filter) or by filter banks (as described in EP 0 971 315). A downsampling in a first step and an upsampling at the end of the process is therefore not absolutely necessary, but is preferred because of the therefor required low processing capacity and the low storage cost.

FIG. 2 illustrates the incorporation of the local image sharpening process in accordance with the invention into a mask correction system which is further described in the following.

FIG. 2 shows an exemplary construction for a correction device in accordance with the invention, whereby the blocks respectively represent units which carry out certain process portions. Alternatively, FIG. 2 can also be considered as illustration of the correction process in accordance with the invention. FIG. 2 especially shows the data flows and the co-operation of the individual components of the system.

Reference numerals which in FIG. 2 commence with 1 relate to the lowest resolution. Reference numerals which begin with 2 relate to the mean resolution and reference numerals which begin with 3 relate to the highest resolution. Reference numerals which commence with 4 relate to a lowering of the resolution and reference numerals with commence with 5 relate to an increase in the resolution. The broken lines in the upper portion of the image relate to the lower resolution. The thick continuous lines in the lower part of the image relate to the higher resolution.

According to the example shown in FIG. 2, an image analysis preferably takes place with the low resolution images. The analysis of the local contrast in block 210 represents an exception. The reduction of the image resolution ("downsampling") is carried out preferably in at least two steps. In the first step, which is carried out in block 410, a reduction occurs of the resolution from the high resolution image (typically over 1,000,000 image elements) to a mean resolution, for example, 200×250 image elements. In block 420 occurs in a second step a further lowering of the image resolution to a low resolution, for example 40×50 image points. The analysis can thereby, if necessary be carried out on images of different resolution.

The coarse masks which are used in blocks 110, 120 and 130, are determined based on an analysis of the coarse image, which results from block 420. The coarse masks are converted into unsharpening masks (correction masks) which preferably correspond to the resolution of the original image, which means one element of the correction mask corresponds to an image element of the original image or the fine image to be corrected.

The increase in resolution is preferably carried out in the same number of steps as the reduction of the resolution so that masks calculated with different resolution can be combined with one another (for example weighted), even before one proceeds to the next resolution or next higher resolution.

The sequence of the processing steps which are shown in FIG. 2 and which are carried out on the image data can also be differently selected. The illustrated processing chain only serves for the illustration of the concept. For reasons of efficiency, it is naturally sensible to combine the individual processing steps as much as possible.

The blocks 110, 150 and 310 serve the purpose of using the available value range or dynamic range as much as possible and are described in more detail further below. The remaining elements of FIG. 2 are first described in more detail in the following.

At the start, a high resolution image with a multitude of image data which are respectively associated with image elements is received (in the image at the bottom left). The image data are reduced in a first step in block 410 and then again reduced in the block 420. The reduced image data present after the block 420 therefore represent an image of low resolution (coarse image). The block 110 is applied to this coarse image, which leads to a spreading of the value range as will be described further below. A multiplying mask 120 is then applied to the then resulting image data which are still present in the same resolution, which mask, for example, has the above mentioned effects on colour saturation. Finally, in block 130, an additive mask is applied which, for example, changes the brightness profile. Further masks can be applied thereafter which change the image properties.

According to FIG. 2, auxiliary masks are calculated based on the coarse image data in block 130. These auxiliary masks relate, for example, to characteristic image regions, such as skin, sky and vegetation, and can be determined, for example, as described above. By way of these masks, it is known to the system which image elements or image parts belong to the characteristic regions or which are associated with characteristic colour tones.

The present invention especially relates only to the left portion of FIG. 2, which means the blocks 420, 140, 560, 210, 510, 300, and 410. This portion can be combined in any way with other correction processes, especially with the right (remaining) portion of the FIG. 2.

A widening of the auxiliary masks to the mean resolution takes place in block 150. The information obtained therefrom is processed in the analysis block 210, which analyses the local image sharpness. The analysis of the local image sharpness is carried out on the basis of the mean resolution image. The reason for this is that the image sharpness at the position of the image element is defined as a function of the image property (for example brightness) at the location of the image element as well as at the location of neighbouring image elements. A peculiarity of the process in accordance with the invention resides not only in that not only local data flow into the analysis of the local image sharpness, i.e. data relating to neighbouring image elements, but information on the image content also flows in through the auxiliary masks widened in block 560, and that depending thereon a mask is determined, the elements of which identify a local image sharpening which considers respectively local data as well as global image data (such as, for example, the belonging to a characteristics image region). The mask for the change of the image sharpness obtained in block 210 is then widened in block 510. The widened correction mask 300 for the change of the image sharpness is then applied to the high resolution image data.

The auxiliary masks are preferably used also for the calculation of the reference tables in block 510, which are then used for the expanding of the image data in block 110, as will be further described further below. The information included in the auxiliary masks especially on the image content is preferably also considered for the calculation of the coarse masks used in the blocks 120 and 130. The calculation of the multiplicative masks takes place in block 160 and the calculation of the additive masks in block 170. The calculation of the multiplicative and additive masks, i.e. in general of the coarse masks, is essentially carried out based on a coarse image and the auxiliary masks are preferably used for the correction of the coarse masks calculated this way.

For example, the calculation of the multiplicative masks takes place in block 160 based on the analysis of the coarse image which results from the use of the LUTs in block 110, i.e. after expanding of the image data. The calculated multiplicative masks are then applied in block 120 to the coarse image. They lead, as discussed above, for example, to a change of the brightness in strongly overexposed or underexposed regions and to a simultaneous change in the colour saturation in these regions. Brightness regions not yet corrected by the multiplicative masks can then in a next step, namely in block 130, be corrected by the use of additive masks. The additive masks are thereby preferably calculated from the coarse image, which results in block 120 from the application of the multiplicative masks (or the multiplicative mask).

The coarse mask calculated in block 160 or the calculated coarse masks are then preferably transformed by expansion in block 520 into a mask of average resolution, i.e. with an average number of elements. In a further step, in block 540, the next expansion takes place which leads to a correction mask with a high number of elements. This correction mask is then applied in block 320 to the fine image data to be corrected, which result after the expansion in block 310.

In an analogous manner, as with the multiplicative mask, a mask of average resolution is determined from the additive mask in two steps, namely in block 530, and then a mask with high resolution (correction mask) is determined through a further expansion in block 550. This correction mask which is based on the coarse mask, is then applied in block 330 to the image data which result from the application of the multiplicative masks in block 320.

The expansion to which the blocks 110, 150 and 310 relate, will be described in the following. Block 150 relates to the calculation of the expansion. The block 110 relates to the application of the expansion to the coarse image and the block 310 relates to the application of the expansion to the image with high resolution. The expansion in block 310 is carried out with the help of a function with was determined in block 150.

It is discussed in the following why such an expansion is preferably carried out. It must thereby be considered that the expansion of the dynamic region of the image data in the processing process shown in FIG. 2 is carried out in a certain portion of the process, namely after the application of the image sharpening of the image. The expansion can also take place elsewhere, for example, at the beginning of the processing process of FIG. 2, i.e. before the image sharpening.

During the taking of a digital image it can occur that (because of technical limitations of the camera, incorrect adjustments by the photographer, and so on) a generally underexposed image is created. In that case, the available level control (for example 0 to 255) is only insufficiently used for all three colours. The image thereby appears too dark and too flat.

Amateur photographs are often also created under unfavourable conditions (incandescent light, neon light, and so on). In such cases, the available level control for at least one of the three colours is insufficiently used. Such images have an annoying colour tinge.

Such exposure errors and illumination errors are preferably corrected already at the beginning of the processing chain (which means before the application of the correction masks, such as the above described additive and mutliplicative masks).

The invention claimed is:

1. A method for changing local sharpness of a photographic image having a multitude of image elements, comprising:

applying a downsampling process to the photographic image to be sharpened, such that coarse image data resulting therefrom represents a coarse image with less detail than the photographic image to be sharpened, wherein the coarse image includes a multitude of coarse image elements;

recognizing at least one region in the coarse image, each such region containing an image of skin, sky or vegetation, wherein the recognition is based at least on a characteristic color in the respective region;

determining a coarse correction mask, elements of the coarse correction mask describing changes of sharpness or local sharpness to be made to respective corresponding image elements of the coarse image, comprising:

using information related the coarse image, including at least local contrast in the coarse image, to determine at least some of the elements of the coarse correction mask; and wherein:

the sharpness of at least some image elements in regions of the coarse image that contain images of skin or sky are to be decreased, according to information related to the respective regions; and the sharpness of at least some image elements in regions of the coarse image that contain images of vegetation are to be increased, according to information related to the respective regions;
applying the coarse correction mask to the coarse image; and
determining a correction mask, elements of the correction mask describing changes of sharpness or local sharpness to be made to respective corresponding image elements of the photographic image;
wherein determining the correction mask comprises using the corrected coarse correction mask.

2. The method of claim 1, wherein using information related the coarse image Comprises using information related to at least one of color tone, color saturation and color contrast of at least one image element in the vicinity of a target image element to determine an element of the coarse correction mask that corresponds to the target image element.

3. The method of claim 1, wherein using information related the coarse image comprises using at least one of:
information obtained from an analysis of the coarse image; and
information associated with the photographic image and input into a correction process.

4. The method of claim 1, further comprising:
analyzing the coarse image to determine if the coarse image contains at least one characteristic image region having a multitude of image elements; and
assigning a nominal image sharpness or a nominal image sharpness range to at least one determined characteristic image region; and
wherein determining the coarse correction mask comprises determining at least some of the elements of the coarse correction mask, such that elements of the coarse correction mask that relate to image elements in the at least one determined characteristic image region cause at least an approximation of the image sharpness to the assigned nominal image sharpness or the assigned nominal image sharpness range.

5. The method of claim 4, further comprising:
determining a degree of association of an image element to a characteristic image region; and wherein
determining the coarse correction mask comprises determining at least some of the elements of the coarse correction mask based on the nominal image sharpness or the nominal image sharpness range and the degree of association of the respective image elements.

6. The method of claim 3, wherein:
using information related the coarse image comprises using color values and image properties including at least brightness and color tone, and further comprising:
determining image content information, comprising:
associating at least one color value with at least one preselected characteristic color value and
associating a nominal image sharpness or a nominal image sharpness range with at least one preselected characteristic color value; and
wherein:
determining the coarse correction mask comprises determining at least some of the elements of the coarse correction mask based on:
color values of image elements of the coarse image that correspond to the respective elements of the coarse correction mask and the preselected characteristic color values associated with the color values of the respective image elements; and the nominal image sharpness or the nominal image sharpness range associated with the predetermined characteristic color value associated with the color values of the respective image elements.

7. The method of claim 3, further comprising:
analyzing the coarse image for a transition between two image regions that each includes a multitude of neighboring image elements, wherein one of the image regions has a different structure than the other image region; and
wherein:
determining the coarse correction mask comprises determining at least some of the elements of the coarse correction mask based on whether or not the respective elements relate to a transition.

8. The method of claim 3, wherein:
using information related the coarse image comprises using data related to the position of artifacts in the coarse image; and
determining the coarse correction mask comprises determining at least some of the elements of the coarse correction mask based on whether or not the respective elements relate to locations in the coarse image where artifacts are present.

9. A device for focussing a photographic image that includes a multitude of image elements, comprising:
a downsampling unit operative to produce a coarse image having less detail than the photographic image;
a recognition unit operative to recognize at least one region of the coarse image, each such region containing an image of skin, sky or vegetation, wherein the recognition is based at least on a characteristic color in the respective region;
a coarse correction mask determining unit operative to determine a coarse correctionmask, wherein:
elements of the coarse correction mask describe changes of sharpness or local sharpness to be made to respective corresponding image elements of the coarse image; and
the elements of the coarse correction mask are determined on the basis of an image property of the coarse image, including at least a local contrast, and additional information relating to the coarse image, such that the sharpness of at least some image elements in regions of the coarse image that contain images of skin or sky are to be decreased, according to information related to the respective regions; and the sharpness of at least some image elements in regions of the coarse image that contain images of vegetation are to be increased, according to information related to the respective regions; and
a correction mask determining unit operative to determine a correction mask using the coarse correction mask.

10. An article of manufacture, comprising:
a computer readable medium storing computer instructions operable to cause a computer that executes the instructions to perform the method of claim 1.

11. The device of claim 9, further comprising an image reproduction device.

12. The device of claim 11, wherein the image reproduction device is selected from the group consisting of a photographic printer, a printer, a photolab, a minilab, a monitor, and a computer with a monitor.

13. A method for changing local sharpness of a photographic image having a multitude of image elements, comprising:
applying a downeampling process to the photographic image to be sharpened, such that coarse image data resulting therefrom represents a coarse image with less detail than the photographic image to be sharpened, wherein the coarse image includes a multitude of coarse image elements;

recognizing at least one region in the coarse image, each such region containing an image of skin, sky or vegetation, wherein the recognition is based at least on a characteristic color in the respective region;

determining a coarse correction mask, elements of the coarse correction mask describing changes of sharpness or local sharpness to be made to respective corresponding image elements of the coarse image, comprising:

using information related the coarse image, including at least local contrast in the coarse image, to determine at least some of the elements of the coarse correction mask, wherein sharpness of at least some image elements in regions of the coarse image exhibiting a high contrast is decreased; and wherein:

the sharpness of at least some image elements in regions of the coarse image that contain images of skin or sky are to be decreased, according to information related to the respective regions; and the sharpness of at least some image elements in regions of the coarse image that contain images of vegetation are to be increased, according to information related to the respective regions;

applying the coarse correction mask to the coarse image; and determining a correction mask, elements of the correction mask describing changes of sharpness or local sharpness to be made to respective corresponding image elements of the photographic image; wherein determining the correction mask comprises using the corrected coarse correction mask.

* * * * *

UNITED STATES PATENT AND TRADEMARK OFFICE
CERTIFICATE OF CORRECTION

PATENT NO.       : 7,103,228 B2                                    Page 1 of 1
APPLICATION NO.  : 10/072773
DATED            : September 5, 2006
INVENTOR(S)      : Walter Kraft et al.

It is certified that error appears in the above-identified patent and that said Letters Patent is hereby corrected as shown below:

Column 16, claim 13, line 66, "downeampling" should read --downsampling--.

Signed and Sealed this

Twenty-fifth Day of December, 2007

JON W. DUDAS
*Director of the United States Patent and Trademark Office*